(12) United States Patent
Tokonami

(10) Patent No.: US 9,197,780 B2
(45) Date of Patent: Nov. 24, 2015

(54) IMAGE READING APPARATUS, IMAGE FORMING APPARATUS

(71) Applicant: KYOCERA Document Solutions Inc., Osaka-shi, Osaka (JP)

(72) Inventor: Minoru Tokonami, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/539,904

(22) Filed: Nov. 12, 2014

(65) Prior Publication Data

US 2015/0138612 A1  May 21, 2015

(30) Foreign Application Priority Data

Nov. 21, 2013  (JP) ................. 2013-241377

(51) Int. Cl.
| | | |
|---|---|---|
| *H04N 1/04* | (2006.01) | |
| *H04N 1/028* | (2006.01) | |
| *H04N 1/00* | (2006.01) | |
| *H04N 1/10* | (2006.01) | |

(52) U.S. Cl.
CPC ....... *H04N 1/02895* (2013.01); *H04N 1/00551* (2013.01); *H04N 1/00554* (2013.01); *H04N 1/10* (2013.01); *H04N 2201/0081* (2013.01); *H04N 2201/0094* (2013.01); *H04N 2201/0422* (2013.01)

(58) Field of Classification Search
CPC .. B41J 2/17513; B41J 2/1752; B41J 2/17523; B41J 2/17553; B41J 2/17566; B41J 29/02; B41J 2/17509; B41J 11/0065; B41J 2002/17573; B41J 2/14201; G03G 15/60; G03G 2215/0021; H04N 1/0083

USPC ........ 271/3.02, 3.05, 3.13, 10.12, 10.13, 122, 271/171, 242, 258.04, 259, 274; 358/474, 358/475, 509; 399/367, 370, 373, 369, 371, 399/405; 362/608, 611

See application file for complete search history.

(56) References Cited

U.S. PATENT DOCUMENTS

| | | | | |
|---|---|---|---|---|
| 5,164,748 | A | * | 11/1992 | Katayanagi et al. ............ 347/30 |
| 5,975,516 | A | * | 11/1999 | Maruchi et al. ............ 271/10.12 |
| 5,992,841 | A | * | 11/1999 | Fujii et al. .................... 271/3.02 |
| 6,010,124 | A | * | 1/2000 | Higashikawa et al. ...... 271/3.02 |
| 6,027,108 | A | * | 2/2000 | Johdai et al. ................. 271/3.02 |
| 2002/0191996 | A1 | * | 12/2002 | Nishikino et al. ............ 399/380 |
| 2006/0007283 | A1 | * | 1/2006 | Sacco et al. ..................... 347/86 |

(Continued)

FOREIGN PATENT DOCUMENTS

JP        2004363754 A     12/2004

*Primary Examiner* — Negussie Worku
(74) *Attorney, Agent, or Firm* — Alleman Hall McCoy Russell & Tuttle LLP (57) ABSTRACT

An image reading apparatus includes a document sheet cover, a pressing portion, and a light irradiating portion. The document sheet cover is openable and closable with respect to a document sheet mounting surface. The pressing portion is provided in a recess formed in a counter surface of the document sheet cover that faces the document sheet mounting surface. The pressing portion is biased in a direction to project from the counter surface. When the document sheet cover is closed, the pressing portion contacts a document sheet placed on the document sheet mounting surface and is housed in the recess. The light irradiating portion is configured to irradiate light, toward the document sheet mounting surface, from a gap formed between a side wall of the recess and the pressing portion.

14 Claims, 4 Drawing Sheets

(56) References Cited

U.S. PATENT DOCUMENTS

| | | |
|---|---|---|
| 2006/0164482 A1* | 7/2006 | Katayama et al. .............. 347/86 |
| 2008/0186374 A1* | 8/2008 | Ito et al. ........................ 347/104 |
| 2014/0036289 A1* | 2/2014 | Muroi .......................... 358/1.13 |
| 2015/0220030 A1* | 8/2015 | Watanabe et al. .............. 358/474 |

* cited by examiner

IMAGE READING APPARATUS, IMAGE FORMING APPARATUS

INCORPORATION BY REFERENCE

This application is based upon and claims the benefit of priority from the corresponding Japanese Patent Application No. 2013-241377 filed on Nov. 21, 2013, the entire contents of which are incorporated herein by reference.

BACKGROUND

The present disclosure relates to an image forming apparatus and an image reading apparatus provided with a document sheet cover.

In general, an image reading apparatus, such as a scanner, which can read an image from a document sheet placed on a document sheet mounting surface, is provided with a document sheet cover that is openable and closable with respect to the document sheet mounting surface. To cause such an image reading apparatus to read an image from a document sheet, the user places the document sheet on the document sheet mounting surface and closes the document sheet cover. After causing the image reading apparatus to execute the process of reading the image from the document sheet, the user opens the document sheet cover and takes out the document sheet from the document sheet mounting surface. Here, with the opening of the document sheet cover, it may happen that the document sheet is blown off from the document sheet mounting surface. In this regard, there is known a technique addressing this problem. According to this technique, a number of projections are provided on a counter surface of the document sheet cover that faces the document sheet mounting surface, to prevent the document sheet from being blown off when the document sheet cover is opened

SUMMARY

An image reading apparatus according to an aspect of the present disclosure includes a document sheet cover, a pressing portion, and a light irradiating portion. The document sheet cover is openable and closable with respect to a document sheet mounting surface. The pressing portion is provided in a recess formed in a counter surface of the document sheet cover that faces the document sheet mounting surface. The pressing portion is biased in a direction to project from the counter surface. When the document sheet cover is closed, the pressing portion contacts a document sheet placed on the document sheet mounting surface and is housed in the recess. The light irradiating portion is configured to irradiate light, toward the document sheet mounting surface, from a gap formed between a side wall of the recess and the pressing portion.

An image forming apparatus according to another aspect of the present disclosure includes an image reading apparatus and an image forming portion. The image reading apparatus includes a document sheet cover, a pressing portion, and a light irradiating portion. The document sheet cover is openable and closable with respect to a document sheet mounting surface. The pressing portion is provided in a recess formed in a counter surface of the document sheet cover that faces the document sheet mounting surface. The pressing portion is biased in a direction to project from the counter surface. When the document sheet cover is closed, the pressing portion contacts a document sheet placed on the document sheet mounting surface and is housed in the recess. The light irradiating portion is configured to irradiate light, toward the document sheet mounting surface, from a gap formed between a side wall of the recess and the pressing portion. The image forming portion is configured to form an image based on image data read by the image reading apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the disclosure. It should be noted that the following description is an example of a specific embodiment of the present disclosure and should not limit the technical scope of the present disclosure.

[Outlined Configuration of Image Forming Apparatus 10]

Figure 1A:
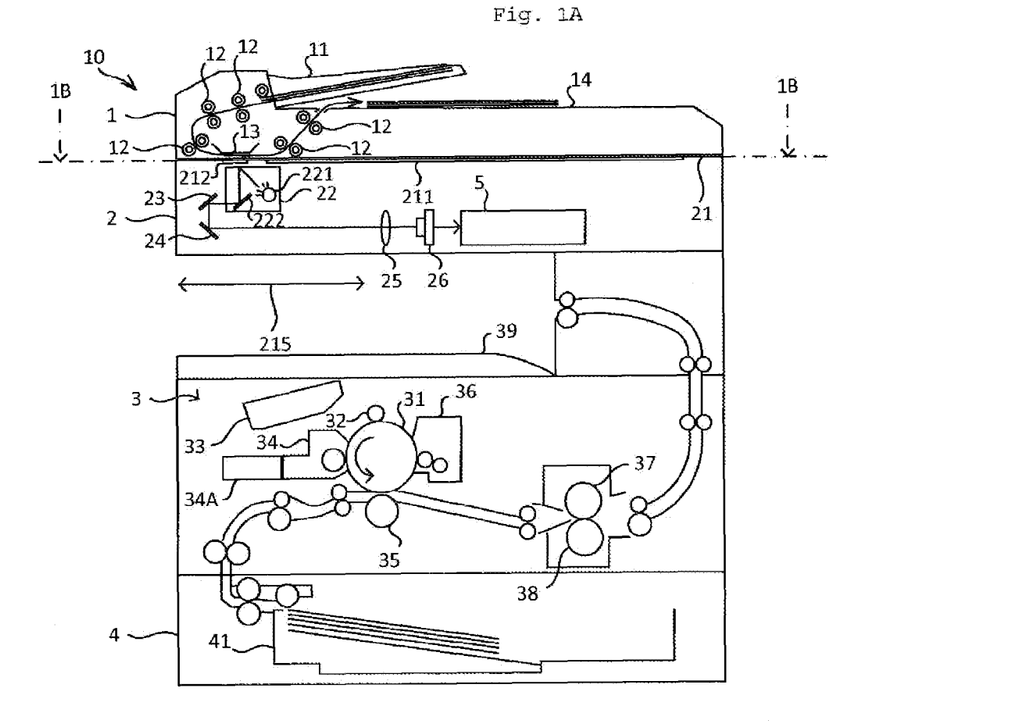
FIGS. 1A and 1B are diagrams showing the configuration of an image forming apparatus according to an embodiment of the present disclosure.
Figure 1B:
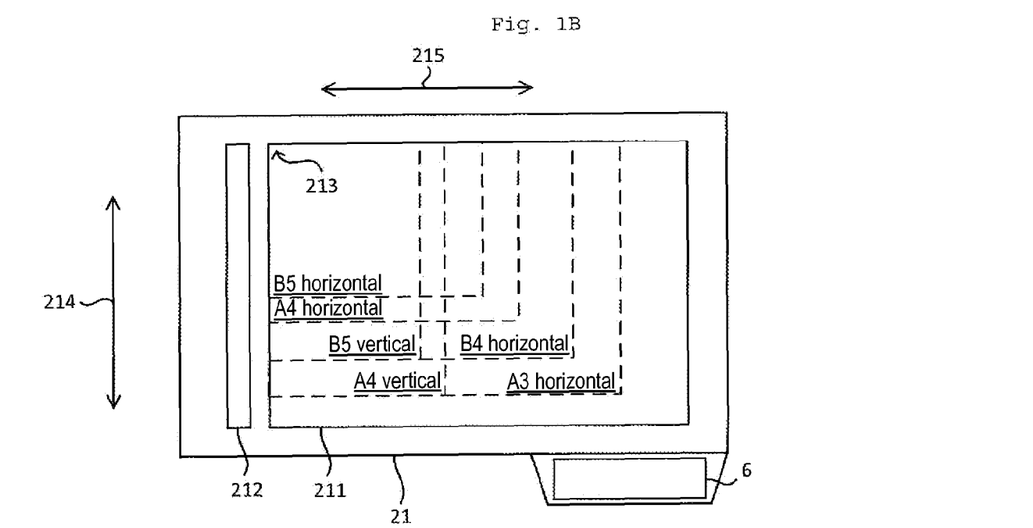

First, an outlined configuration of an image forming apparatus 10 in an embodiment of the present disclosure is described. Here, FIG. 1A is a schematic cross-sectional view of the image forming apparatus 10. FIG. 1B is a figure taken along the 1B-1B line of FIG. 1A and viewed from a direction indicated by the arrows.

As shown in FIGS. 1A and 1B, the image forming apparatus 10 includes an ADF 1, an image reading portion 2, an image forming portion 3, a sheet feed portion 4, a control portion 5, and an operation display portion 6. The image forming apparatus 10 is a multifunction peripheral having a plurality of functions such as a printer function, a facsimile function, a copy function and the like, as well as a scan function to read image data from the document sheet. It is noted that, in the image forming apparatus 10, a configuration including the ADF 1 and the image reading portion 2 is an example of the image reading apparatus of the present disclosure. In addition, the present disclosure is applicable to an image forming apparatus or an image reading apparatus such as a scanner, a facsimile apparatus, a copier or the like.

The image forming portion 3 is an image forming portion adopting the electrophotography and executes an image forming process (print process) based on the image data which is read by the image reading portion 2 or input from an external information processing apparatus such as a personal computer. Specifically, as shown in FIG. 1A, the image forming portion 3 includes a photoconductor drum 31, a charging device 32, an exposure device (LSU) 33, a developing device 34, a transfer roller 35, a cleaning device 36, a fixing roller 37, a pressure roller 38, and a discharge tray 39. In the image forming portion 3, an image is formed in the following procedure on a paper sheet supplied from a sheet feed cassette 41 that is attachable and detachable to/from the sheet feed portion 4, and the paper sheet with the image formed thereon is discharged onto the discharge tray 39.

First, the charging portion 32 charges the surface of the photoconductor drum 31 uniformly into a certain potential. Next, the exposure device 33 irradiates the surface of the photoconductor drum 31 with light based on the image data. With this operation, an electrostatic latent image corresponding to the image data is formed on the surface of the photoconductor drum 31. Then the electrostatic latent image on the photoconductor drum 31 is developed (made visible) into a toner image by the developing device 34. It is noted that the toner (developer) is supplied to the developing device 34 from a toner container 34A that is attachable and detachable to/from the image forming portion 3. Subsequently, the toner image formed on the photoconductor drum 31 is transferred to a paper sheet by the transfer roller 35. The print sheet is then conveyed to pass through between the fixing roller 37 and the pressure roller 38, where the toner image having been transferred to the print sheet is heated by the fixing roller 37 so as to be fused and fixed to the print sheet. It is noted that the toner remaining on the surface of the photoconductor drum 31 is removed by the cleaning device 36.

The control portion 5 includes control equipment such as CPU, ROM, RAM, EEPROM, and the like that are not shown. The CPU is a processor for executing various types of arithmetic processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memories (working areas) for the various types of processes executed by the CPU. The control portion 5 comprehensively controls the image processing apparatus 10 by causing the CPU to execute the various types of control programs that have been stored in advance in the ROM. It is noted that the control portion 5 may be formed as an electronic circuit such as an integrated circuit (ASIC). Alternatively, the control portion 5 may be a control portion provided independently of a main control portion that comprehensively controls the image processing apparatus 10.

The operation display portion 6 includes a display portion and an operation portion. The display portion is, for example, a liquid crystal display and displays various types of information based on control instructions from the control portion 5. The operation portion is composed of, for example, hard keys or a touch panel through which various types of information are input to the control portion 5 based on user's operations.

The image reading portion 2 is an image reading portion that can read image data from the document sheet. Specifically, as shown in FIGS. 1A and 1B, the image reading portion 2 includes a document sheet table 21, a reading unit 22, mirrors 23, 24, an optical lens 25, and a CCD (Charge Coupled Device) 26.

The document sheet table 21 is provided on the upper surface of the image reading portion 2. As shown in FIG. 1B, the document sheet table 21 includes a document sheet mounting surface 211 and a conveying-and-reading surface 212. The document sheet mounting surface 211 is translucent contact glass on which a document sheet, from which image data is to be read, is placed. Document sheets of various sizes can be placed on the document sheet mounting surface 211 to be positioned at a predetermined mounting reference position 213. Specifically, document sheets of B5 vertical, A4 vertical, B5 horizontal, A4 horizontal, B4 horizontal, and A3 horizontal sizes can be placed on the document sheet mounting surface 211. That is, the maximum readable size in the image forming apparatus 10 is A3 horizontal. It is noted that the mounting reference position 213 may be the center of the document sheet mounting surface 211 in a main scanning direction 214. It is also noted that the conveying-and-reading surface 212 is made of glass and allows the light, which was irradiated from the reading unit 22 toward the document sheet conveyed by the ADF 1, to transmit therethrough.

The reading unit 22 includes a light source 221 and a mirror 222, and is configured to be driven and moved in a sub scanning direction 215 by a moving mechanism (not shown) that uses a driving source such as a stepping motor or the like. When the reading unit 22 is moved in the sub scanning direction 215 by the driving source, the light irradiated from the light source 221 toward the document sheet table 21 is scanned in the sub scanning direction 215.

The light source 221 includes a number of white LEDs arranged along the main scanning direction 214. The light source 221 irradiates the document sheet with a line of white light arrayed in the main scanning direction 214 from below the document sheet mounting surface 211 or the conveying-and-reading surface 212 of the document sheet table 21, by causing the white light to pass through the document sheet mounting surface 211 or the conveying-and-reading surface 212. It is noted that the white light irradiated by the light source 221 has a width along the main scanning direction 214 that corresponds to the document sheet mounting surface 211. A light irradiation position where the light is irradiated by the light source 221 is an image data reading position where the image data is read by the image reading portion 2. The reading position moves in the sub scanning direction 215 as the reading unit 22 moves in the sub scanning direction 215. Specifically, when reading image data from a document sheet placed on the document sheet mounting surface 211, the reading unit 22 is moved to a position where the light irradiated by the light source 221 passes through the document sheet mounting surface 211. Here, the light source 221 is an example of the first light source. In addition, when reading image data from a document sheet conveyed by the ADF 1, the reading unit 22 is moved to a position where the light irradiated by the light source 221 passes through the conveying-and-reading surface 212.

The mirror 222 reflects, toward the mirror 23, light which was irradiated from the light source 221 and reflected on the surface of the document sheet at the reading position on the document sheet table 21. The light reflected on the mirror 222 is guided into the optical lens 25 by the mirrors 23, 24. The optical lens 25 condenses the light incident from the mirror 24 and makes the condensed light incident on the CCD 26.

The CCD 26 is an image sensor including a photoelectric converting element that converts the received light into an electric signal (voltage), which corresponds to an amount of the received light, and outputs the electric signal as the image data. Upon receiving light incident from the light source 221, the CCD 26 inputs an electric signal, which is based on the incident light that was reflected on the document sheet, to the control portion 5 as image data of the document sheet.

Figure 2:
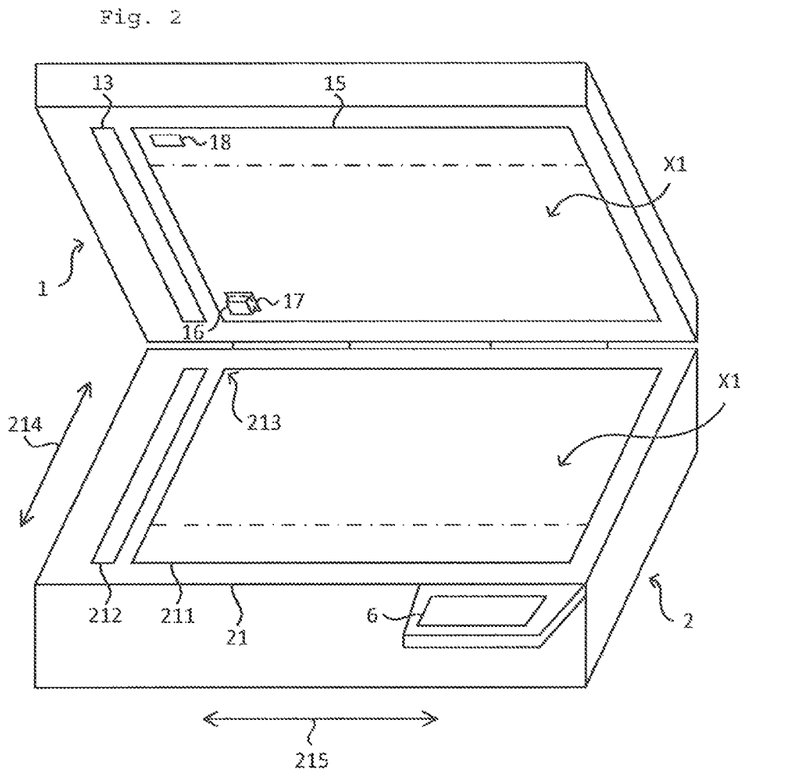
FIG. 2 is a diagram showing the configuration of an ADF of the image forming apparatus according to an embodiment of the present disclosure.

As shown in FIGS. 1A and 2, the ADF 1 is an automatic document sheet feeding device and includes a document sheet setting portion 11, a plurality of conveying rollers 12, a document sheet pressing 13, a sheet discharge portion 14, and a document sheet pressing 15. The ADF 1 is supported so as to be openable and closable with respect to the document sheet table 21, and also serves as a document sheet cover for covering the document sheet placed on the document sheet mounting surface 211. Of course, a configuration where the image forming apparatus 10 includes, instead of the ADF 1, a document sheet cover that is openable and closable with respect to the document sheet table 21, may be considered as another embodiment of the present disclosure.

In the ADF 1, the plurality of conveying rollers 12 are driven by motors (not shown) such that a document sheet placed on the document sheet setting portion 11 is conveyed to pass through an image data reading position where the image data is read by the image reading portion 2, and then conveyed to the sheet discharge portion 14. With this configuration, the image reading portion 2 can read image data from the document sheet conveyed by the ADF 1. The document sheet pressing 15 is a counter surface of the ADF 1 that faces the document sheet mounting surface 211, and is a white plate-shaped member or a white sheet member having a plane surface that is wide enough to cover the document sheet mounting surface 211.

Meanwhile, when the ADF 1 is opened, it may happen that a document sheet placed on the document sheet mounting surface 211 is blown off therefrom. In this regard, there is known a technique where a number of projections are provided on the counter surface of the ADF 1 that faces the document sheet mounting surface 211, to prevent the document sheet from being blown off when the ADF 1 is opened. However, according to this configuration using a plurality of projections, when the document sheet is irradiated with light during the image reading process, shadows are generated by the height difference of the projections and the shadows may affect the image data read from the document sheet. On the other hand, as described below, the image forming apparatus 10 restricts the document sheet from being blown off when the ADF 1 is opened, and reduces the influence of a member(s), which is required to restrict the movement of the document sheet, on the image data read from the document sheet.

First, a description is given of the configuration of the image forming apparatus 10 for restricting the document sheet from being blown off when the ADF 1 is opened, with reference to FIGS. 2 through 6.

Figure 3:
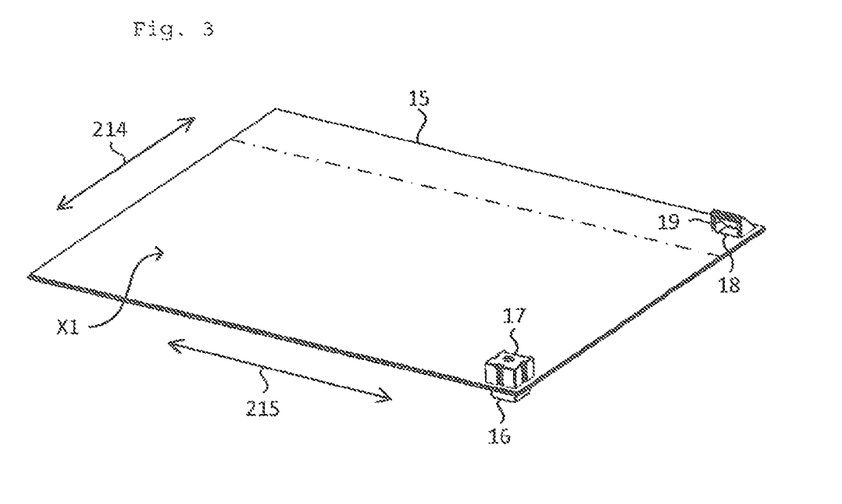
FIG. 3 is a diagram showing the rear surface side of a document sheet pressing of the ADF of the image forming apparatus according to an embodiment of the present disclosure.

In the image forming apparatus 10, as shown in FIGS. 2 and 3, a pressing portion 16 and a recess 17 are provided in the ADF 1. It is noted that the dotted chain lines in FIGS. 2 and 3 indicate a predetermined maximum reading range X1 within the document sheet mounting surface 211 in the main scanning direction 214. The maximum reading range X1 is a range corresponding to a document sheet of A3 horizontal size that is placed on the document sheet mounting surface 211, positioned at the mounting reference position 213.

The recess 17 is provided in the document sheet pressing 15 at a position corresponding to the mounting reference position 213. It is noted that in the case where the mounting reference position 213 is the center of the document sheet mounting surface 211 in the main scanning direction 214, the pressing portion 16 may be provided at a position corresponding to the mounting reference position 213, and the recess 17 may be provided at a position outside the maximum reading range X1 in the main scanning direction 214.

Figure 5A:
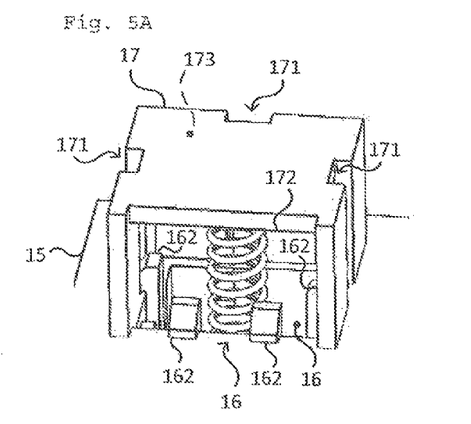
FIGS. 5A and 5B are perspective views of the pressing portion and the recess provided in the image forming apparatus according to an embodiment of the present disclosure.
Figure 5B:
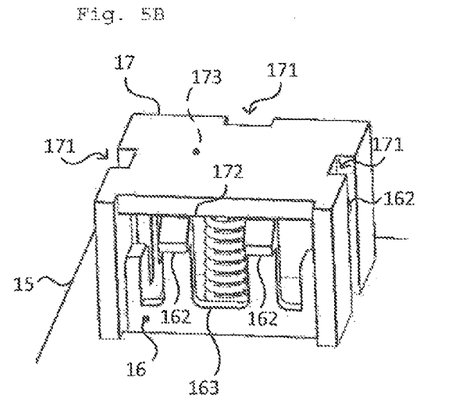

The recess 17 is a recess having a rectangular parallelepiped shape with a bottom, formed in the document sheet pressing 15 that is a counter surface of the ADF 1 that faces the document sheet mounting surface 211, and is projecting toward the rear surface side of the document sheet pressing 15. It is noted that the rear surface side of the document sheet pressing 15 is a space between the housing of the ADF 1 and the document sheet pressing 15, or an internal space of the ADF 1, and is not exposed to outside of the apparatus. In addition, as shown in FIGS. 5A and 5B, the recess 17 includes rail portions 171 that guide the sliding of the pressing portion 16. Specifically, the rail portions 171 are openings formed to extend in a direction vertical to the document sheet pressing 15.

The pressing portion 16 is slidably provided in the recess 17. More specifically, as shown in FIGS. 5A and 5B, the pressing portion 16 includes a plurality of locking portions 162 that limit the sliding range of the pressing portion 16 with respect to the recess 17. The locking portions 162 respectively have claws that project outside the opening formed in the document sheet pressing 15. With the configuration where the claws of the locking portions 162 contact the edges of the recess 17 formed in the document sheet pressing 15, the locking portions 162 restrict the movement of the pressing portion 16 in a direction to project from the document sheet pressing 15.

Among the locking portions 162, three locking portions 162, except for one provided on the side of a first reflecting portion 19 (which is described below), can be moved in a direction vertical to the document sheet pressing 15 along the rail portions 171 of the recess 17. It is noted that the locking portions 162 are formed in an elongated shape extending in parallel with the rail portions 171 such that the locking portions 162 close the rail portions 171 of the recess 17 in the state where the pressing portion 16 is housed in the recess 17.

Figure 4:
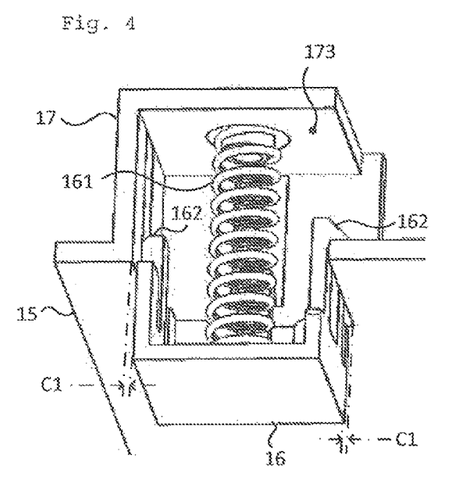
FIG. 4 is a cross-sectional view of main parts of the pressing portion and the recess provided in the image forming apparatus according to an embodiment of the present disclosure.

As shown in FIG. 4, a biasing member 161 is provided between the pressing portion 16 and the recess 17, wherein the biasing member 161 biases the pressing portion 16 in a direction to project from the document sheet pressing 15. Specifically, the biasing member 161 is an elastic member, such as a coil spring, wherein an end of the biasing member 161 is fixed to a bottom 173 of the recess 17 and the other end is fixed to the pressing portion 16. As a result, when the ADF 1 is opened, the pressing portion 16 is biased by the biasing member 161 and projects from the document sheet pressing 15. On the other hand, when the ADF 1 is closed, the pressing portion 16 contacts the document sheet placed on the document sheet mounting surface 211, and is compressed and housed in the recess 17.

When the ADF 1 is in the process of being opened and the document sheet pressing 15 is in the process of being separated from the document sheet, the pressing portion 16 projects from the document sheet pressing 15 and presses the document sheet. Subsequently, when the ADF 1 is further opened, the pressing portion 16 is separated from the document sheet, as well. With this configuration of the image forming apparatus 10, the document sheet is restricted from being blown off when the ADF 1 is opened.

In addition, in the image forming apparatus 10, in the state where the ADF 1 is closed, the pressing portion 16 is housed in the recess 17. As a result, no height difference is generated between the document sheet pressing 15 and the pressing portion 16. Accordingly, this reduces the influence of the presence of the pressing portion 16 and the recess 17 on the image data read from the document sheet.

Meanwhile, since the pressing portion 16 is slidable with respect to the recess 17, a gap C1 (see FIG. 4) is formed between the recess 17 and the pressing portion 16. As a result, there is a possibility that the presence of the gap C1 may affect the image data. In view of this, the image forming apparatus 10 has a configuration for restricting the influence of the gap C1 on the image data.

The following describes the configuration that is provided in the image forming apparatus 10 to restrict the influence of the presence of the pressing portion 16 and the recess 17 on the image data read by the image reading portion 2 from the document sheet placed on the document sheet mounting surface 211, with reference to FIGS. 2 through 6.

Figure 6:
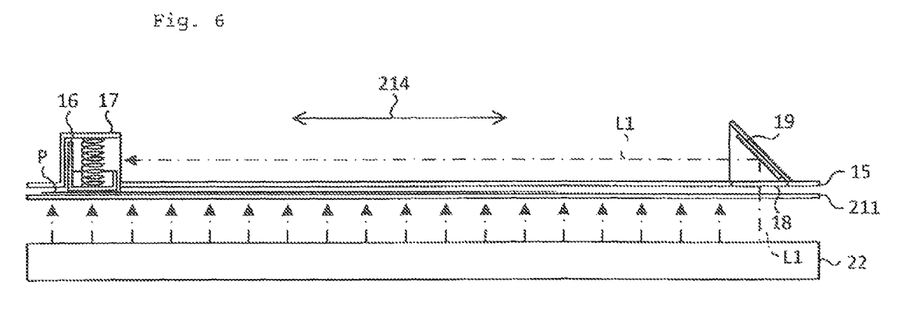
FIG. 6 is a diagram showing an optical path inside the ADF of the image forming apparatus according to an embodiment of the present disclosure.

As shown in FIGS. 2 and 3, in the image forming apparatus 10, the ADF 1 is provided with a translucent portion 18 and a first reflecting portion 19. The translucent portion 18 is formed at a position that is outside the maximum reading range X1 in the main scanning direction 214, and is included in the same range as the recess 17 in the sub scanning direction 215. For example, the translucent portion 18 includes a through hole and a translucent plate-like member. The through hole is formed in the document sheet pressing 15 and penetrates through the front and rear surfaces of the document sheet pressing 15. The plate-like member is inserted in the through hole. With this configuration, as shown in FIG. 6, when the reading unit 22 of the image forming apparatus 10 reads the image data, the translucent portion 18 causes light L1 irradiated from the light source 221 to be transmitted therethrough to the rear surface side of the document sheet pressing 15. It is noted that the translucent portion 18 may be just an opening, without the plate-like member.

As shown in FIG. 3, the first reflecting portion 19 is a mirror disposed slanted on the rear surface of the document sheet pressing 15, at a position above the translucent portion 18. With this configuration, as shown in FIG. 6, the first reflecting portion 19 reflects the light L1, which has come from the light source 221 through the translucent portion 18, toward the pressing portion 16 and the recess 17.

On the other hand, as shown in FIGS. 5A and 5B, an opening 172 is formed in a counter surface of the recess 17 facing the first reflecting portion 19, to make the light from the first reflecting portion 19 incident in the recess 17. Similarly, as shown in FIGS. 5A and 5B, an opening 163 is formed in a counter surface of the pressing portion 16 facing the first reflecting portion 19, to make the light from the first reflecting portion 19 incident in the recess 17. As a result, in the state where the ADF 1 is closed, that is, in the state where the pressing portion 16 is housed in the recess 17, the reflection light from the first reflecting portion 19 passes through the opening 172 of the recess 17 and the opening 163 of the pressing portion 16 and enters the inside of the recess 17.

In addition, the biasing member 161 disposed in the recess 17 is a coil spring that is shaped to diffuse the light incident from the first reflecting portion 19. Here, the biasing member 161 is an example of the light diffusion portion of the present disclosure. With this configuration, the light incident in the recess 17 is irradiated by the biasing member 161 toward the document sheet mounting surface 211 from the gap C1. It is noted that, in the state where the pressing portion 16 is housed in the recess 17, the rail portions 171 are closed by the locking portions 162, thereby restricting the diffusion light generated by the biasing member 161 from leaking outside the recess 17. Meanwhile, the rail portions 171 may be grooves formed on the inner side of the side walls of the recess 17, without openings in the side walls of the recess 17. Furthermore, the biasing member 161 is not limited to a coil spring as far as it can diffuse the light incident from the first reflecting portion 19.

The bottom 173 of the recess 17 functions as a reflection surface that reflects the diffusion light generated by the biasing member 161 toward the document sheet mounting surface 211 from the gap C1. Here, the biasing member 161 and the bottom 173 are an example of the second reflecting portion. In particular, a high-reflection sheet or the like having a high reflectance may be adhered to the bottom 173. With this configuration, the bottom 173 irradiates the light, which is incident in the recess 17, toward the document sheet mounting surface 211 from the gap C1. Here, the first reflecting portion 19, the biasing member 161, and the bottom 173 are an example of the light irradiating portion of the present disclosure.

As described above, in the image forming apparatus 10, when the reading unit 22 reads image data from a document sheet placed on the document sheet mounting surface 211, light is irradiated toward the document sheet mounting surface 211 from the gap C1. More specifically, when image data is read from a document sheet that corresponds to an area in the sub scanning direction 215 in which the pressing portion 16 and the recess 17 are formed, light is irradiated toward the document sheet mounting surface 211 from the gap C1. This reduces the influence of the pressing portion 16 and the recess 17 provided in the ADF 1, on the image data read from the document sheet. For example, the configuration restricts a black shadow of the gap C1 from being read at a position corresponding to the gap C1. In addition, in the image forming apparatus 10, the light irradiated from the light source 221 of the reading unit 22 is irradiated by the first reflecting portion 19 and the reflection surface 173 toward the document sheet mounting surface 211 from the gap C1. As a result, there is no need to independently provide a light source for irradiating light toward the document sheet mounting surface 211 from the gap C1.

Other Embodiments

Meanwhile, a configuration where the image forming apparatus 10 includes, independently of the light source 221, a second light source for irradiating light toward the document sheet mounting surface 211 from the gap C1, may be considered as another embodiment of the present disclosure. For example, an LED light source (an example of the second light source) for irradiating white light may be provided inside the recess 17. With this configuration, for example, when a document sheet of a size to cover the whole area of the document sheet mounting surface 211 is placed on the document sheet mounting surface 211, the control portion 5 can cause the light to be irradiated from the gap C1 by lighting the light source provided inside the recess 17.

In addition, a configuration where the image forming apparatus 10 includes a plurality of sets of the pressing portion 16, recess 17, translucent portion 18, and first reflecting portion 19 in the document sheet pressing 15 at different positions in the sub scanning direction 215, may be considered as a still another embodiment of the present disclosure. Furthermore, a configuration where the image forming apparatus 10 includes a plurality of sets of the pressing portion 16, recess 17, translucent portion 18, and first reflecting portion 19 in the document sheet pressing 15 at positions different in both the sub scanning direction 215 and the main scanning direction 214, may be considered as a further embodiment of the present disclosure. With such a configuration, locations pressing the document sheet placed on the document sheet mounting surface 211 are increased in number, and the document sheet is more effectively restricted from being blown off when the ADF 1 is opened.

Figure 7A:
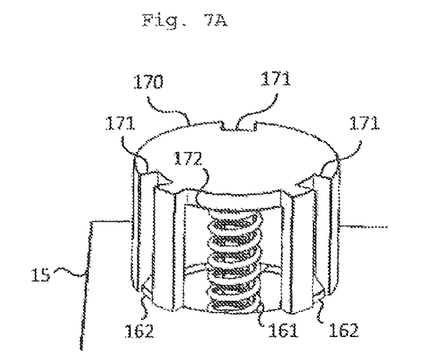
FIGS. 7A and 7B are diagrams showing other examples of the pressing portion and the recess provided in the image forming apparatus according to an embodiment of the present disclosure.
Figure 7B:
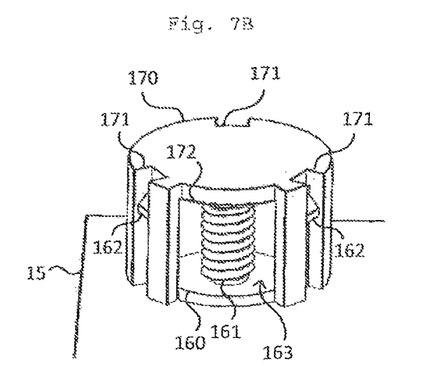

Furthermore, the pressing portion 16 and the recess 17 are not limited to the shapes shown in FIGS. 4, 5A, and 5B. For example, as shown in FIGS. 7A and 7B, the image forming apparatus 10 may include, instead of the pressing portion 16, a pressing portion 160 whose surface that contacts the document sheet is circular. In this case, as shown in FIGS. 7A and 7B, the image forming apparatus 10 includes, instead of the recess 17, a recess 170 having a cylindrical shape with a bottom in correspondence with the shape of the pressing portion 160. In the pressing portion 160 shown in FIGS. 7A and 7B, three locking portions 162 are provided at equal intervals along the circumferential direction of the pressing portion 160. In this configuration of the pressing portion 160 and the recess 170, as shown in FIGS. 7A and 7B, openings 163 of the pressing portion 160 are wider than their counterparts of FIGS. 5A and 5B, and thus a more amount of light is irradiated from the first reflecting portion 19 into the recess 170. It is noted that when the surface of the pressing portion 160 that contacts the document sheet is circular and the recess 170 has a cylindrical shape with a bottom, the pressing portion 160 can be slid stably with respect to the recess 170 even when the locking portions 162 are provided at three positions along the circumferential direction of the pressing portion 160.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
    a document sheet cover openable and closable with respect to a document sheet mounting surface;
    a pressing portion provided in a recess formed in a counter surface of the document sheet cover that faces the document sheet mounting surface, the pressing portion being biased in a direction to project from the counter surface, wherein when the document sheet cover is closed, the pressing portion contacts a document sheet placed on the document sheet mounting surface and is housed in the recess;
    a light irradiating portion configured to irradiate light, toward the document sheet mounting surface, from a gap formed between a side wall of the recess and the pressing portion; and
    a first light source configured to irradiate light from below the document sheet mounting surface toward the document sheet placed on the document sheet mounting surface, wherein
    the document sheet cover includes:
        a translucent portion formed at a position that is outside a predetermined maximum reading range in a main scanning direction on the document sheet mounting surface, the translucent portion and the recess being included in a same range in a sub scanning direction, and the translucent portion being configured to allow the light irradiated from the first light source to transmit therethrough to a rear surface side of the counter surface, and
    the light irradiating portion includes:
        a first reflecting portion configured to reflect the light, which was irradiated from the first light source and has transmitted through the translucent portion, toward the recess; and
        a second reflecting portion configured to reflect the light, which was made incident in the recess by the first reflecting portion, toward the document sheet mounting surface.

2. The image reading apparatus according to claim 1, wherein
    the second reflecting portion includes:
        a light diffusion portion configured to diffuse the light that was made incident in the recess and emit diffusion light; and
        a reflection surface configured to reflect the diffusion light, which was emitted by the light diffusion portion, toward the document sheet mounting surface.

3. The image reading apparatus according to claim 2, wherein
    the light diffusion portion is a spring configured to bias the pressing portion in a direction to project from the counter surface.

4. An image forming apparatus comprising:
    the image reading apparatus according to claim 1; and
    an image forming portion configured to form an image based on image data read by the image reading apparatus.

5. An image reading apparatus comprising:
    a document sheet cover openable and closable with respect to a document sheet mounting surface;
    a pressing portion provided in a recess formed in a counter surface of the document sheet cover that faces the document sheet mounting surface, the pressing portion being biased in a direction to project from the counter surface, wherein when the document sheet cover is closed, the pressing portion contacts a document sheet placed on the document sheet mounting surface and is housed in the recess;
    a light irradiating portion configured to irradiate light, toward the document sheet mounting surface, from a gap formed between a side wall of the recess and the pressing portion;
    a locking portion is formed on the pressing portion,
    an opening as a rail portion for guiding sliding of the locking portion is formed in a side wall of the recess, and
    the rail portion is closed by the locking portion in a state where the pressing portion is housed in the recess.

6. The image reading apparatus according to claim 5, wherein
    wherein the opening is a groove that is formed on an inner side of a side wall of the recess.

7. The image reading apparatus according to claim 6, wherein
    a surface of the pressing portion that contacts the document sheet is circular,
    the locking portion is one or a plurality of locking portions of the pressing portion, the locking portions being formed at equal intervals at three positions along a circumferential direction,
    the recess has a cylindrical shape with a bottom corresponding to a shape of the pressing portion, and
    the rail portion is one of a plurality of rail portions formed on an inner side of a side wall of the recess, the plurality of rail portions being configured to guide sliding of the locking portions.

8. An image forming apparatus comprising:
the image reading apparatus according to claim 5; and
an image forming portion configured to form an image based on image data read by the image reading apparatus.

9. The image reading apparatus according to claim 5, wherein
  a surface of the pressing portion that contacts the document sheet is circular,
  the locking portion is one of a plurality of locking portions of the pressing portion, the locking portions being formed at equal intervals at three positions along a circumferential direction,
  the recess has a cylindrical shape with a bottom corresponding to a shape of the pressing portion, and
  wherein the rail portion is one of a plurality of rail portions formed on an inner side of a side wall of the recess, the plurality of rail portions being configured to guide sliding of the locking portions.

10. An image reading apparatus comprising:
  a document sheet cover openable and closable with respect to a document sheet mounting surface;
  a pressing portion provided in a recess formed in a counter surface of the document sheet cover that faces the document sheet mounting surface, the pressing portion being biased in a direction to project from the counter surface, wherein when the document sheet cover is closed, the pressing portion contacts a document sheet placed on the document sheet mounting surface and is housed in the recess;
  a light irradiating portion configured to irradiate light, toward the document sheet mounting surface, from a gap formed between a side wall of the recess and the pressing portion; and wherein
  a locking portion is formed on the pressing portion, and
  a groove as a rail portion for guiding sliding of the locking portion is formed on an inner side of a side wall of the recess.

11. The image reading apparatus according to claim 10, wherein
  a surface of the pressing portion that contacts the document sheet is circular,
  the locking portion is one of a plurality of locking portions of the pressing portion, the locking portions being formed at equal intervals at three positions along a circumferential direction,
  the recess has a cylindrical shape with a bottom corresponding to a shape of the pressing portion, and
  wherein the rail portion is one of a plurality of rail portions formed on an inner side of a side wall of the recess, the plurality of rail portions being configured to guide sliding of the locking portions.

12. An image forming apparatus comprising:
the image reading apparatus according to claim 10; and
an image forming portion configured to form an image based on image data read by the image reading apparatus.

13. An image reading apparatus comprising:
  a document sheet cover openable and closable with respect to a document sheet mounting surface;
  a pressing portion provided in a recess formed in a counter surface of the document sheet cover that faces the document sheet mounting surface, the pressing portion being biased in a direction to project from the counter surface, wherein when the document sheet cover is closed, the pressing portion contacts a document sheet placed on the document sheet mounting surface and is housed in the recess;
  a light irradiating portion configured to irradiate light, toward the document sheet mounting surface, from a gap formed between a side wall of the recess and the pressing portion; and wherein
  a surface of the pressing portion that contacts the document sheet is circular,
  the pressing portion includes
  locking portions formed at equal intervals at three positions along a circumferential direction,
  the recess has a cylindrical shape with a bottom corresponding to a shape of the pressing portion, and
  the recess includes
  rail portions configured to guide sliding of the locking portions.

14. An image forming apparatus comprising:
the image reading apparatus according to claim 13; and
an image forming portion configured to form an image based on image data read by the image reading apparatus.

* * * * *